Aug. 26, 1952 L. OESTREICHER 2,608,126
APPARATUS FOR PROJECTING STRIP FILMS
AND RELATED CABINET STRUCTURES
Filed March 21, 1950 6 Sheets-Sheet 1

INVENTOR
LEONARD OESTREICHER
BY
Fisher + Christen
ATTORNEYS

Aug. 26, 1952 — L. OESTREICHER — 2,608,126
APPARATUS FOR PROJECTING STRIP FILMS
AND RELATED CABINET STRUCTURES
Filed March 21, 1950 — 6 Sheets-Sheet 2

INVENTOR
LEONARD OESTREICHER
BY
Fisher & Christen,
ATTORNEYS

Aug. 26, 1952 L. OESTREICHER 2,608,126
APPARATUS FOR PROJECTING STRIP FILMS
AND RELATED CABINET STRUCTURES
Filed March 21, 1950 6 Sheets-Sheet 4
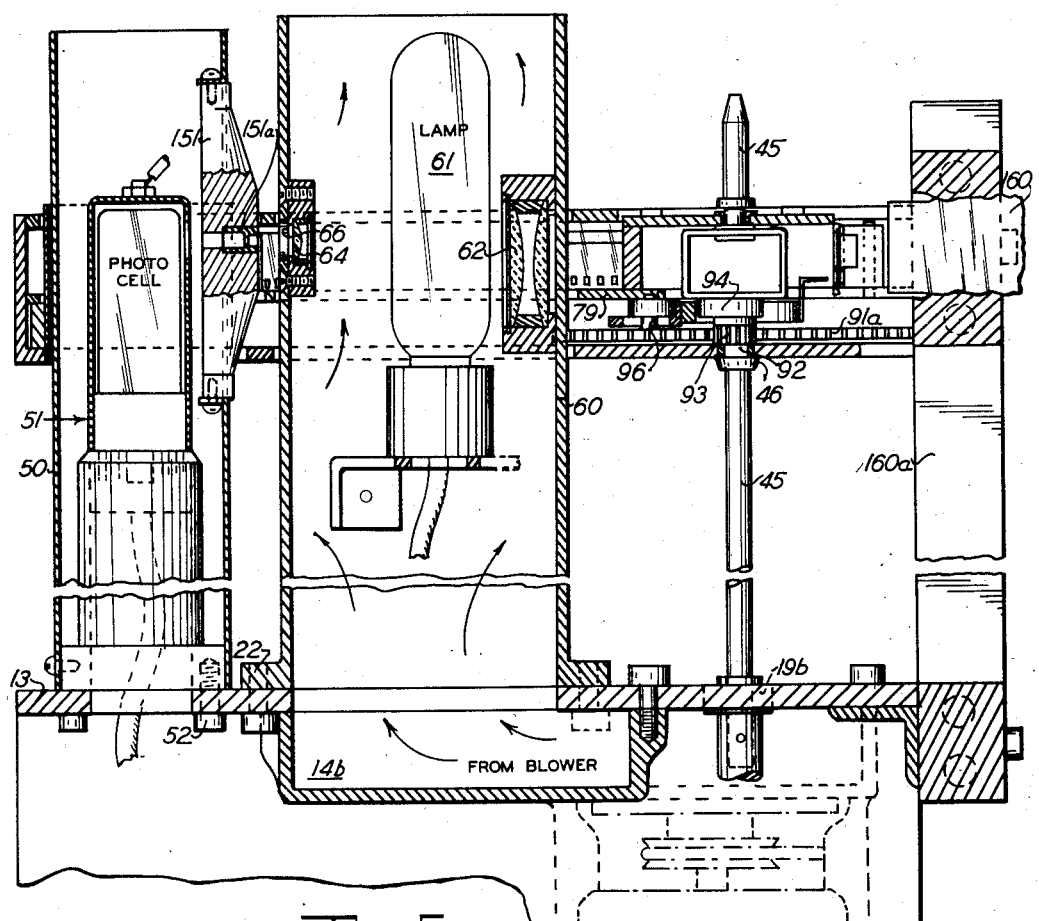
Fig. 6
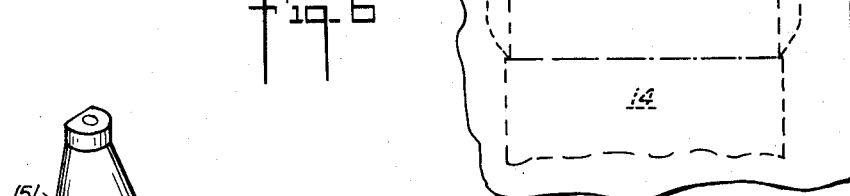
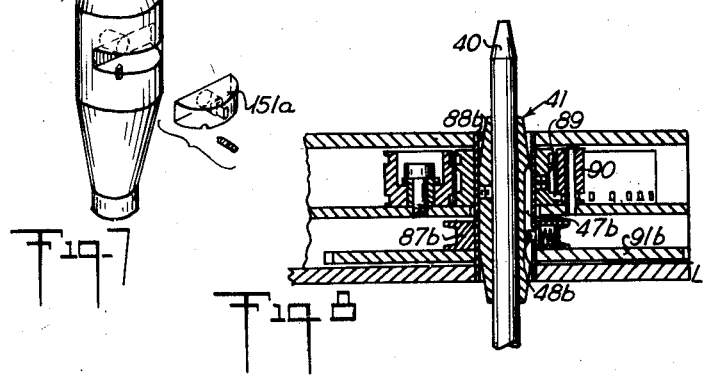
Fig. 7
Fig. 8
INVENTOR
LEONARD OESTREICHER
BY Fisher + Christen,
ATTORNEYS Aug. 26, 1952 L. OESTREICHER 2,608,126
APPARATUS FOR PROJECTING STRIP FILMS
AND RELATED CABINET STRUCTURES
Filed March 21, 1950 6 Sheets-Sheet 5
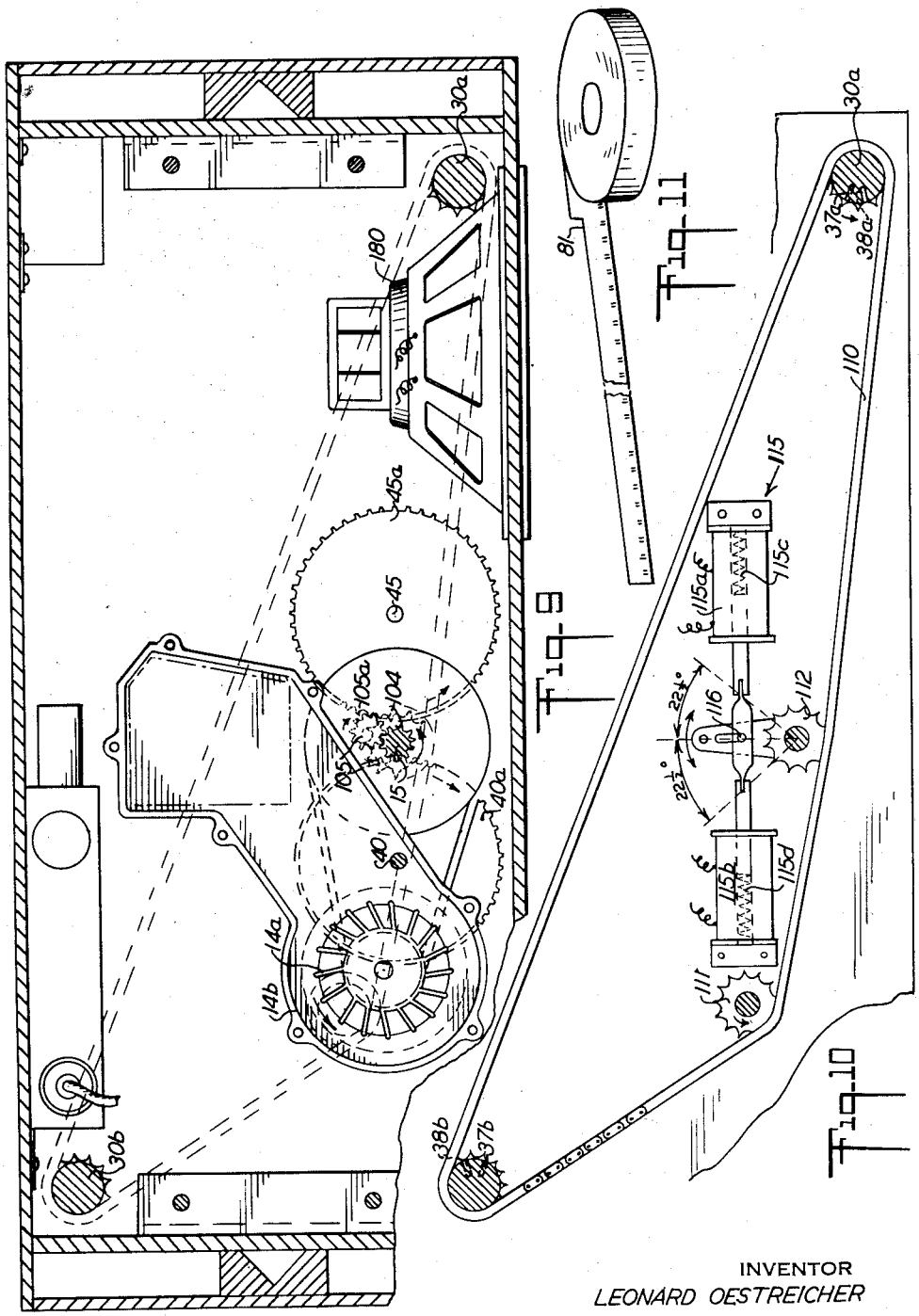
INVENTOR
*LEONARD OESTREICHER*
BY
*Fisher + Christen,*
ATTORNEYS

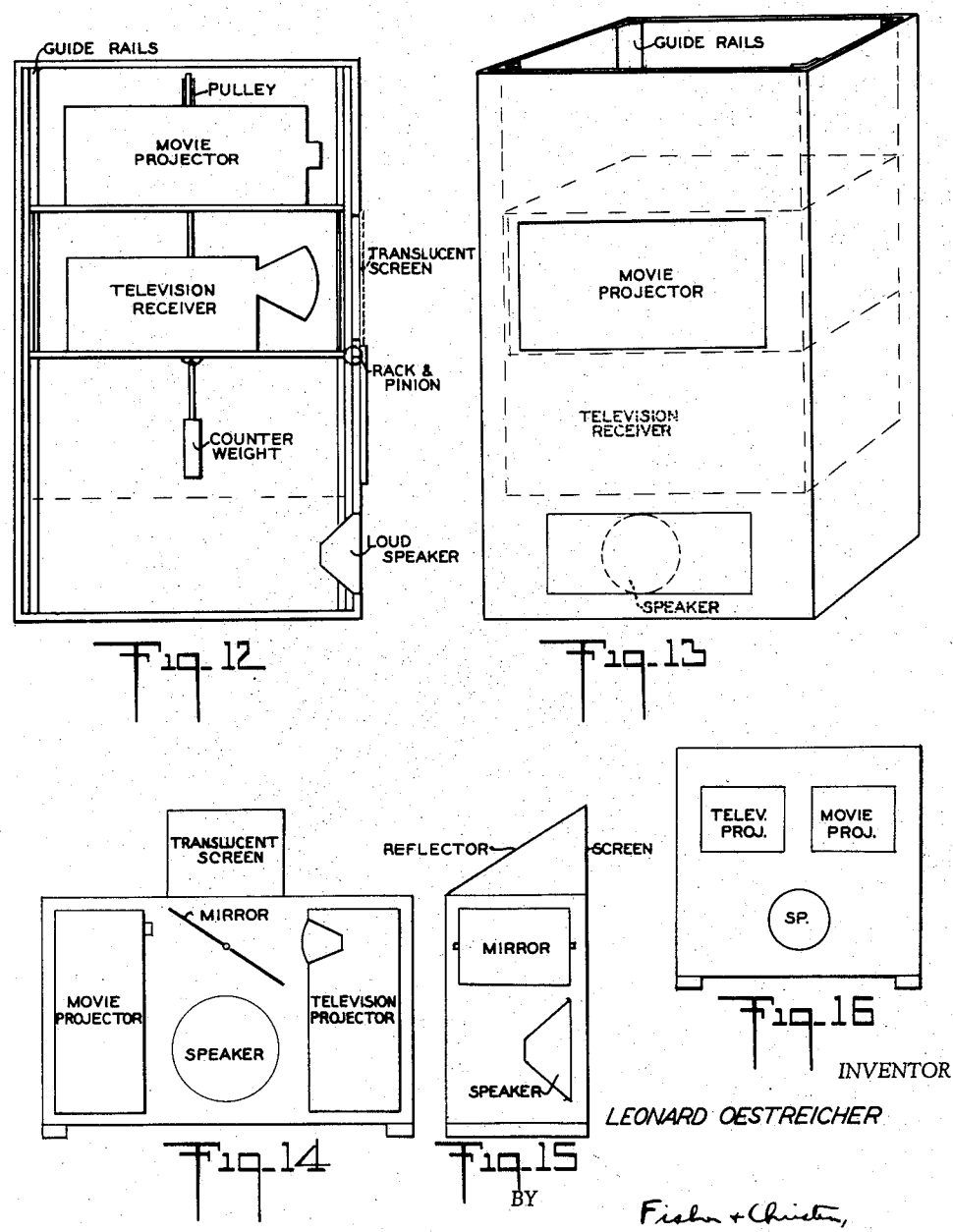

UNITED STATES PATENT OFFICE 2,608,126

APPARATUS FOR PROJECTING STRIP FILMS AND RELATED CABINET STRUCTURES

Leonard Oestreicher, New York, N. Y.

Application March 21, 1950, Serial No. 150,839

9 Claims. (Cl. 88—16.2)

This invention relates to methods and apparatus for projecting strip film including the method of projecting strip film in a magazine carried in a projector having a projecting portion and a non-projecting portion which comprises supporting said magazine in the projection portion, driving said film in said magazine and simultaneously projecting said film while the magazine is maintained in the projecting portion, and transferring said magazine to the non-projecting portion, and has particular relation to methods and apparatus for automatically feeding, projecting, rewinding and storing strip film disposed in one or more cartridges or magazines carried by the projector.

One object of the invention is to provide methods and apparatus for automatically projecting strip film.

Another object of the invention is to provide methods and apparatus for sequentially feeding, projecting, rewinding and storing strip film in such manner and by such means that the entire sequence of operations may be performed automatically.

Still another object of the invention is to provide methods and apparatus which will perform the foregoing objects with reels of strip film which are individually mounted in separate magazines carried by the projector in such manner and by such means that the magazine will be automatically transferred from a projecting stage or station to a non-projecting station, which may comprise a rewinding station, and if desired, the magazine may be sequentially transferred to a further non-projecting or storage station.

Yet another object of the invention is to provide methods and apparatus for projecting strip film including a sound track such that the sound will be automatically transmitted, or will be simultaneously transmitted with the automatic projection of the film.

Still another object of the invention is to provide methods and apparatus for automatically and sequentially projecting a plurality of strip films individually mounted in separate magazines positioned in stacked relationship and carried in a projector.

Still another object of the invention is to provide methods and apparatus for achieving the foregoing objects and which will automatically transfer a film containing magazine from one station to the next by the force of gravity and wherein the transfer means may be actuated when the film has been driven a predetermined distance.

Still another object of the invention is to provide methods and apparatus whereby a series of strip film reels may be automatically and sequentially projected with each of the strip film reels separately encased in its respective magazine throughout the entire projector operation.

A further object of the invention is to provide a cabinet construction which is adapted to combine into an integral unit the combination of a television receiver, a motion picture projector, and a screen for receiving images projected from the projector, and/or from the receiver.

Another object of the invention is to provide such a cabinet construction which will be capable of utilizing a single aperture and/or a single screen in registry therewith in the cabinet for the passage of the pictures projected from either, or both the television receiver and the motion picture projector.

These and other objects of the invention will be better understood by reference to the following description and accompanying drawings.

In general, the present invention includes in a cabinet construction, the combination of a television receiver, apparatus for projecting strip film, and a screen for receiving images projected from said projection apparatus or from said receiver. The invention also generally includes in a cabinet construction, the combination of a television receiver, a motion picture projector, said cabinet having an aperture, a translucent screen adapted to be positioned in and out of registry with said aperture, and means for moving either said receiver or said projector into registry with said aperture. In a preferred embodiment, the invention generally comprises in a cabinet construction, the combination of a motion picture projector, a television picture projector, said cabinet having an aperture, a transluscent screen adapted to be positioned in and out of registry with said aperture, and a common means for supporting said projectors in superposed relation, said support being vertically movable for bringing either of said projectors into registry with said aperture, and may include, in addition, means for moving either said receiver or said projector into registry with said aperture, and means for moving said screen simultaneously with said first means.

In general, the present invention further includes apparatus for projecting strip film comprising a projector, a magazine adapted to contain said film, means for driving said film in said magazine, said projector including a projecting stage and a non-projecting stage, and positioning means for maintaining said magazine at the projecting stage during the film driving operation and for transferring said magazine to the non-projecting stage and the method of projecting strip film in a magazine carried in a projector having a projecting portion and a non-projecting portion which comprises supporting said magazine in the projection portion, driving said film in said magazine and simultaneously projecting said film while the magazine is maintained in the projecting portion, and transferring said magazine to the non-projecting portion.

In one embodiment, the present invention includes the aforesaid apparatus wherein the non-projecting stage comprises a rewind stage and a storage stage, positioning means for maintaining said magazine at the projecting stage during the unwinding operation, for transferring said magazine to the rewind stage, for maintaining said magazine at the rewind stage and for transferring said magazine to the storage stage.

The present invention further includes apparatus for projecting strip film comprising a projector, a magazine adapted to contain a wound reel of film and a second reel for receiving the unwound film, driving means, including means at one stage for unwinding said film from one of said reels to the other and means at another stage for rewinding said film from said second reel onto said first reel, said projector including positioning means for maintaining said magazine in operative engagement with the driving means at one of said stages and for transferring said magazine into operative engagement with said driving means at the said other stage.

In a preferred embodiment, the driving means and the positioning means each comprises a pair of operatively connected shafts and the magazine includes respective openings for receiving said driving means and said positioning means and means adjacent said openings for engaging said driving and positioning means.

More particularly, the present invention includes apparatus for projecting strip film comprising a projector and a magazine, said projector including a base, a drive shaft vertically mounted on said base, a positioning shaft vertically mounted on said base, a support verticalyl mounted on said base, and containing a projection lamp and a pair of projection lens systems, a second support vertically mounted on said base in cooperative relation to one of said lens systems and containing a sound pick up device, said magazine being adapted to contain a wound reel of strip film and a second reel for receiving the unwound film, said magazine including respective openings for receiving said shafts and said supports, and means adjacent said shaft openings for engaging said shafts, said magazine being releasably mounted on said positioning shafts.

In a preferred form, the present invention includes supporting said magazine in the projection portion, unwinding and simultaneously projecting said film while the magazine is maintained in the projecting portion, transferring said magazine to the non-projecting portion, and rewinding said unwound film while the magazine is maintained in the non-projecting portion.

In a further aspect, wherein the non-projecting stage comprises a rewinding stage and a storage stage, the present invention includes the method of projecting a series of strip films, each strip positioned in its respective magazine, said magazines being carried in a projector having a projecting portion, a rewinding portion and a storage portion, which comprises supporting said magazines in stacked relationship in and adjacent the projecting portion, unwinding and simultaneously projecting one of said film while its respective magazine is maintained in the projecting portion, transferring said magazine to the non-projecting portion and simultaneously transferring an adjacent stacked magazine to the projecting portion, rewinding said unwound film while the said magazine is maintained in the non-projecting stage, simultaneously therewith unwinding and projecting the film in said adjacent magazine, transferring said rewound magazine to the storage portion while simultaneously transferring said unwound magazine to the rewinding portion and simultaneously transferring an adjacent magazine to the projecting portion.

In the drawings:

Fig. 5A is an enlarged, detailed, inverted perspective view showing the cam structure for actuating the pivoted shutter arm;

Fig. 6 is an enlarged, partial sectional view taken on the angular line 6—6 of Fig. 5, showing the sound pick-up and projection supports in association with the strip film, the shutter, and the drive means;

Fig. 7 is a detailed, exploded perspective view showing the photocell element of the sound pick-up device shown in Fig. 6;

Fig. 8 is a fragmentary, sectional view taken on the line 8—8 of Fig. 5, showing the detail of the drive shaft in operative engagement with the magazine drive structure;

Fig. 9 is an enlarged view taken on the line 9—9 of Fig. 3 showing the actuating mechanism for rotating the positioning shafts;

Fig. 10 is a diagrammatic view of the actuating mechanism for the positioning shafts, as shown in Fig. 9, in association with the actuating solenoid switch means;

Fig. 11 is a detailed perspective view showing a film strip with a cut-away portion at an end thereof for closing the contacts which energize the solenoid switch;

Fig. 12 is a sectional, side view of a preferred cabinet construction showing one aspect of the present invention with a conventional television receiver and a motion picture projector movably mounted in the cabinet;

Fig. 13 is a perspective view of the cabinet structure shown in Fig. 12;

Figure 14 is a front view, broken away in part, showing a further embodiment of a preferred cabinet construction with a conventional television receiver and a motion picture projector fixedly mounted in the cabinet;

Fig. 15 is a diagrammatic side view taken on the line 15—15 of Fig. 14, and

Fig. 16 is a front view of a further embodiment of the present cabinet construction.

Figure 1:
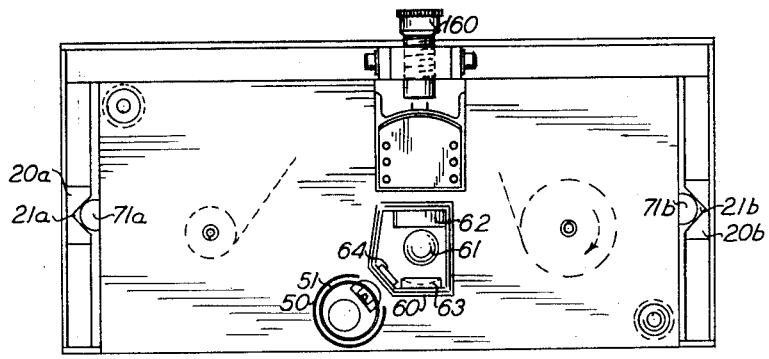
Fig. 1 is a top view of a projector and magazine carried thereby, showing a preferred embodiment of the invention.

Referring now to the drawings, particularly Figs. 1 to 4, a preferred embodiment of the invention is shown in the form of a projector apparatus indicated generally at 10. The apparatus includes a case 11 and a base 12. A platform 13 is mounted parallel above the base 12, and secured to the bottom side of the platform 13 is an electric motor 14, connected, as by a pulley system 101 to a main drive shaft 15. The mechanical arrangement for driving the apparatus will be more fully explained hereinafter.

Mounted on the base 12 is a pair of vertical, opposed guide standards 20a and 20b having opposed key-way portions 21a and 21b adapted to define a vertical positioning path for the passage of the magazine indicated generally at 70. Each of the magazines 70 is provided with a pair of guide pins 71a and 71b adapted to slide in the opposed key-way portions.

A pair of vertical positioning shafts 30a and 30b are rotatably mounted diagonally opposed to each other on the base 12 and rotatably positioned in the platform 13 by bearings as indicated at 16a, 16b, 17a and 17b, respectively. The positioning shafts 30a and 30b are of such length above the platform 13 that they provide an area or path for the downward vertical movement of the magazines 70. Additionally, both positioning shafts are provided with opposed playing or unwinding stage portions 31a, 31b, opposed rewinding stage portions 32a, 32b and storage portions 33a and 33b. The magazines 70 are provided with cooperating passages 72a and 72b, adapted to slidably receive the positioning shafts 30a and 30b. The positioning shafts 30a and 30b are actuated, as by solenoids 115, as will hereinafter be more fully explained.

Figure 2:
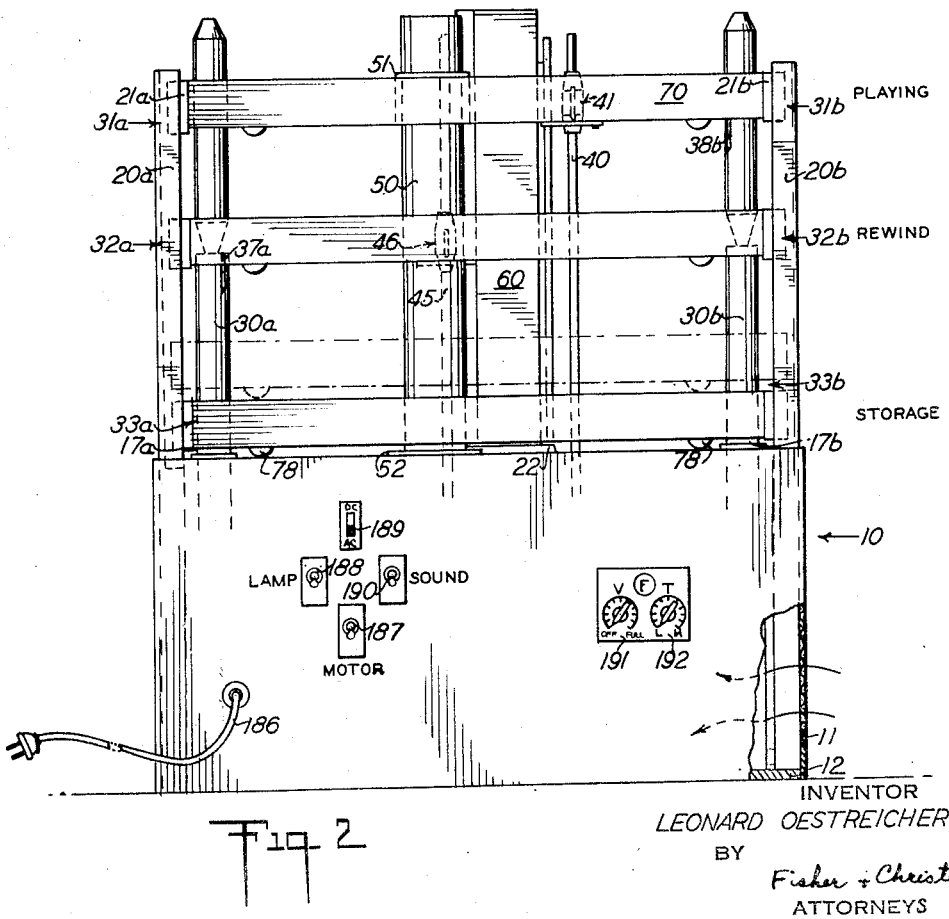
Fig. 2 is a back view of the apparatus shown in Fig. 1, broken away in part adjacent a corner of the base to show the air intake ports for the cooling system.

A vertically positioned playing drive shaft 40 and a vertically positioned rewind drive shaft 45 are rotatably mounted in the base 12 and through the platform 13 as in bearings 18a and 18b, and 19a and 19b, respectively. Playing drive shaft 40 and rewind drive shaft 45 are each provided with a driving sleeve, indicated generally at 41 and 46, respectively, which engage respective the cooperating drive elements 48a and 48b (see Fig. 8) of the magazines 70 to unwind or rewind the film. As shown in Fig. 2, the driving sleeve 41 on the playing drive shaft 40 is positioned at the playing or unwinding stage, whereas the driving sleeve 46 on the rewind drive shaft 45 is positioned at the rewind stage.

A sound pickup standard 50 is mounted and secured onto the platform 13, as by a flange and bolt connection 52 and carries in its upper portion at the playing stage, a sound pickup unit, indicated generally at 51. The magazines 70 are each provided with a cooperating opening 76 adapted to slidably receive the sound pickup standard.

Mounted on the platform 13, as by means of a flange and bolt connection 22, is a hollow projector lens standard 60 which carries at the playing stage a projection lamp 61. The projection standard 60 also serves to carry a projector lens system 62, a projection lamp reflector 63, a sound track projection lens system 64, and additionally serves as an air passage or conduit 65 for directing a coolant stream of air created by a conventional fan arrangement 14a mounted on the shaft of the motor 14, the conduit connection being further provided by a housing 14b leading to the standard passage 65.

Figure 4:
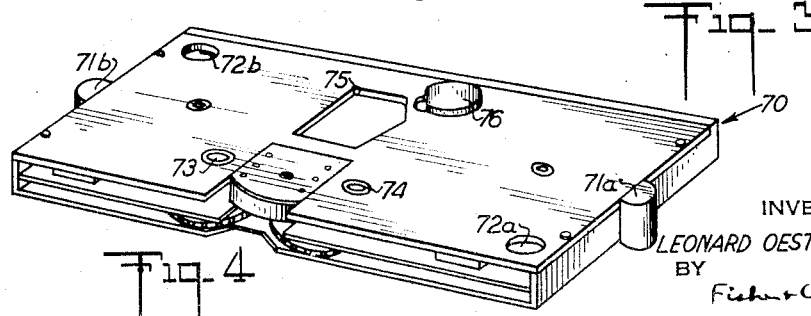
Fig. 4 is a perspective view of a magazine or cartridge embodying the present invention.

Referring particularly to Fig. 4, the magazine or cartridge indicated generally at 70, is provided with passages 72a and 72b adapted to slidably receive the positioning shafts 30a and 30b, the passages 73 and 74 adapted to receive the drive and rewind sleeves 41 and 46 respectively, and the passages 75 and 76 adapted to receive the projection standard 60 and the sound pickup standard 50 respectively.

Referring now particularly to Figs. 3, 5, 6, 8 and 9, the driving mechanism and arrangement will now be described. The driving means including the motor 14, depending from the platform 13, is connected, as by means of a reduction gear and belt arrangement 101 to the main drive shaft 15. The main drive shaft 15 is rotatably mounted between the base 12 and the platform 13 of the unit, as indicated by the bearings shown at 102, 103.

The main drive shaft 15 is connected to the playing shaft 40 and the rewind shaft 45. In the embodiment shown, the main drive shaft 15 carries a reduction gear 104 which is geared to the gear wheel 40a. The driving gear 104 is also geared to take off gear 105a carried by an independent shaft 105, which in turn is geared to a gear wheel 45a carried by the rewind shaft 45. It will thus be apparent that the playing shaft 40, as shown in Fig. 9, rotates in a clockwise direction, the main drive shaft 15 rotates counterclockwise, the auxiliary shaft 105 rotates clockwise and the rewind shaft 45 rotates counterclockwise.

Figure 3:
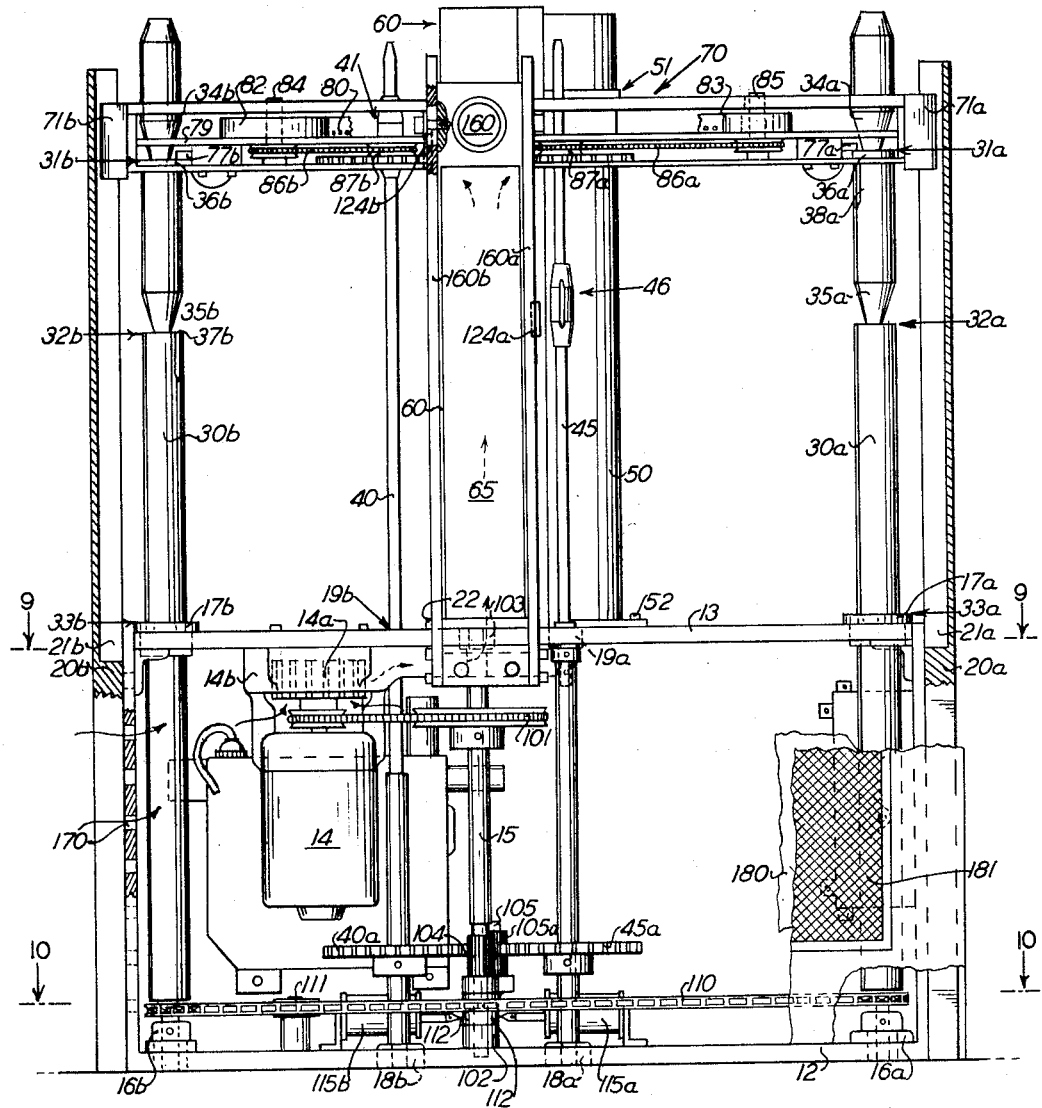
Fig. 3 is an enlarged front view of the device showing the projection side, with the parts shown in section, the view being partially unbroken at a corner of the base to show the position and structure of the loud speaker and its panel.

The mechanical arrangement for pivoting the positioning shafts 30a and 30b is shown particularly in Figs. 3, 9 and 10, the latter being a diagrammatic view. The positioning shafts 30a and 30b are mechanically connected, as by means of a sprocket chain arrangement 110 connected to sprocket 112, the latter being rotatably mounted as on the main drive shaft 15.

The toothed sprocket 112 is connected to a solenoid switch device indicated generally at 115, which, in the form shown, comprises a pair of solenoids 115a and 115b mounted on a common longitudinal axis and connected by means of a pin and slot pivot arrangement 116 to the sprocket 112, so that the sprocket 112 may be oscillated, thereby rotating the positioning shafts 30a and 30b to permit gravitational movement of the magazine 70 from its playing position or stage to the rewind stage, and on reversal of the pivotal movement permit gravitational movement of the magazine 70 from the rewind stage to the storage stage.

In the form shown, the solenoid switch and pivot arrangement 115 is adapted to permit a total one-way movement of 45° for the idler 112. As shown diagrammatically in Fig. 10, the solenoid switch arrangement 115, coupled to the sprocket 112, is shown in the neutral or playing position. Upon actuation of the actuating means 115 by means of energizing the solenoids 115a, the pin and slot arrangement will be pulled clockwise 22½° toward the energized solenoid 115a, thereby pivoting the idler 112 by 22½° in a clockwise direction, causing the chain belt 110 to be driven clockwise, the chain being sprocketed to the positioning shafts 30a and 30b, causing clockwise rotation thereof in the amount of 22½° from the neutral postion.

When the solenoid 115a is de-energized, it will be apparent that the slot linkage 116 will return to the neutral position, due to compression and tension of the springs 115c and 115d, causing return of the playing stage members 31a and 31b (see Fig. 3) and rewind stage members 32a and 32b to the neutral position. In the embodiment shown, the next stage of operation involves energization of the solenoid 115b, which causes movement of the pivot and slot linkage 116 in a counter-clockwise direction through a 22½° arc, causing a similar rotation of the playing and rewind stage members 31a and 32a and 31b and 32b through the chain belt linkage 110. In the next state of operation, the solenoid 115b is de-energized causing return of the pin and slot linkage 116 to the normal position, due to the urging of the springs 115c and 115d to return to normal position. Each 22½° arc movement of the positioning shafts may be considered as a sequential stage of operation of the positioning elements 31a—31b, and 32a—32b.

Figure 5:
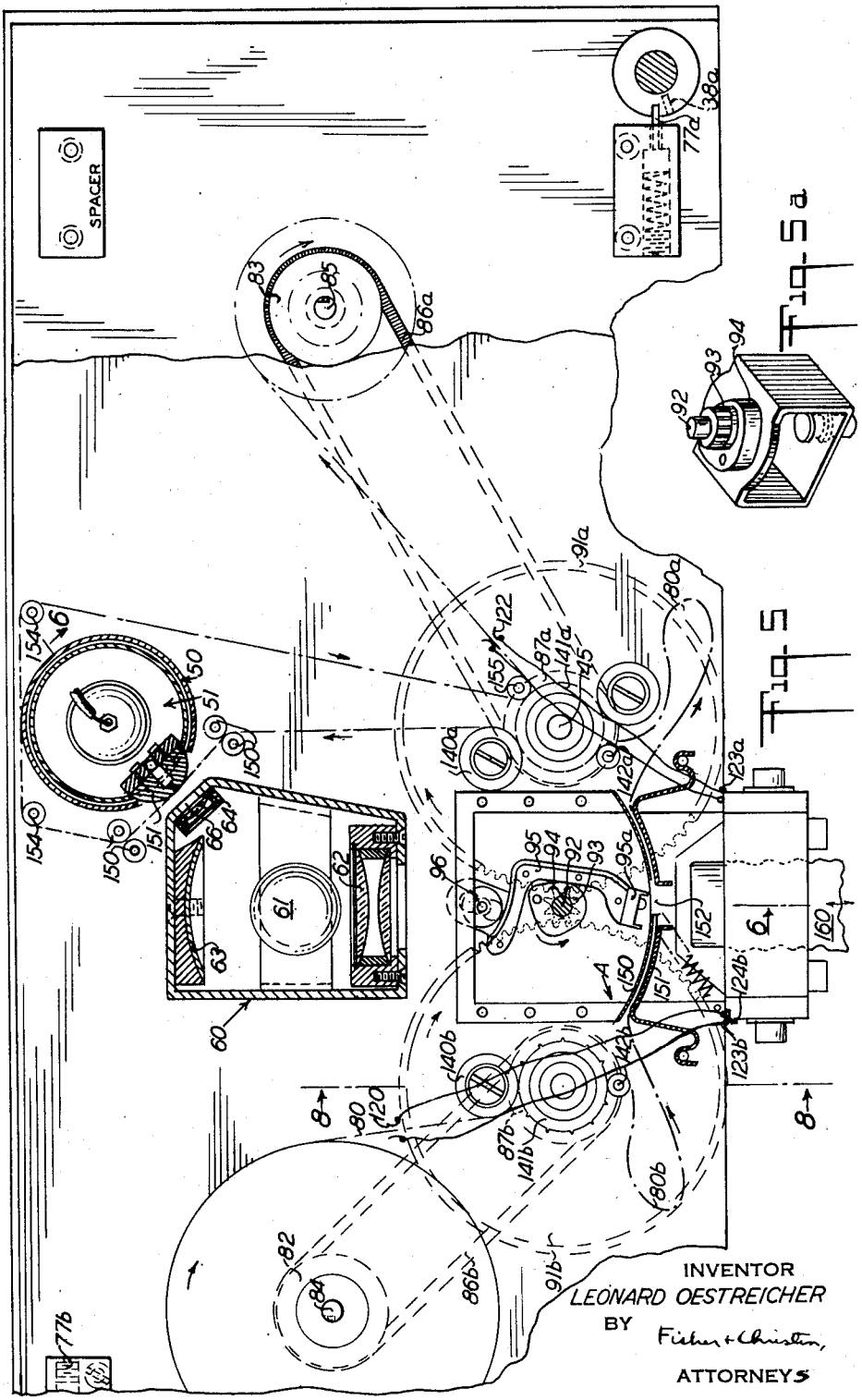
Fig. 5 is an enlarged bottom view, partially broken away to show the film driving mechanism as mounted and in association with the projector, with the magazine in the playing position.

Referring particularly to Figs. 3 and 5, the positioning shafts 30 are provided at the playing stage and at the rewind stage with downwardly and inwardly extending conical portions 34a—34b, and 35a—35b respectively. Outwardly extending flange or ledge portions 36a—36b, and 37a—37b are provided at the bottom of the conical portions 34 and 35 respectively. Outwardly tapering vertical grooves or slots 38a—38b, and 39a—39b extend downwardly from each of the flanges to provide a runway for the passage of the spring-biased detents 77a—77b mounted adjacent the positioning shaft openings 72a and 72b in the magazine.

The slots at the playing stage and at the rewind stage on their respective shafts are positioned 22½% away, on opposite sides, from the neutral, playing position; that is, from the detents 77 seated on the ledges 36 and 37. Additionally, on each shaft, the slot at the rewind stage is 45° from the slot at the playing stage; that is, each slot is 22½° oppositely away from the neutral position defined by the position of the detents 77.

In the embodiment shown, the solenoid switch 115a is energized electrically through the switch contacts 120, see Fig. 5, which are normally held out of contact by the film 80 which, as shown in Fig. 11, is provided at the trailing end with a strip cutaway portion 81 so that the contacts will close the circuit when the cutaway portion 81 passes through the contacts 120. If desired, the portion 81 may be conductive, instead of cutaway, to provide an electrical connection for the contacts.

Upon completion of the playing of a full reel 82 of film 80, the cutaway portion 81 (see Fig. 11) is moved into position between the contacts 120, which permits the contacts to close the circuit thereby energizing the solenoid 115a, which causes the positioning shafts 30a and 30b to be revolved 22½° in the clockwise direction. By this means the slots at the playing stage are positioned directly below the spring-biased detents 77a and 77b which permits the magazine to drop downwardly, by gravity.

As the magazine drops, the detents 77 are gradually pressed against their springs by merging of the tapered slots 38 with the diameter of the shafts 30. The magazine is provided with a pair of contacts 123b which slidingly engage a respective pair of vertical strip contacts 124b mounted on the eyepiece standard 160b at the playing stage. In the embodiment shown, the length of the strip contacts 124b is slightly greater than the length of the slots 38 so that the sliding contact will be broken and deenergize the solenoid 115a when the detents 77 emerge from the slots 38 and engage the diameter surface of the shafts 30.

When the solenoid 115a is deenergized, it returns the shafts 30 to their neutral position by virtue of the springs 115c and 115d. By this means, additional magazines may be stacked upon a magazine in the playing stage, inasmuch as the shafts 30 are returned to neutral playing position before the succeeding magazine detents reach the ledges 31. When the inward conical portions 35a and 35b of the shafts are reached by the pins 77, the pins are spring-pressed against the conical surfaces 35a and 35b and come to rest on the flange portions 37a and 37b, at which point the magazine 70 has reached the rewind stage and is maintained in this position until the reverse cycle occurs.

When the magazine is at the rewind stage, the rewind sleeve on the rewind shaft 45 engages the spring-biased detent 48a, causing the rewinding of the film off the take-up reel 83 onto the playing reel 82 in the reverse manner as described in performing the playing operation. It will be apparent that the rewind operation will be performed at the same rate of speed as the playing operation for the succeeding magazine at the playing stage. Thus, the film in the magazine at the rewind stage may be rewound simultaneously with the playing or unwinding of the film in a magazine at the playing stage.

In the embodiment described, a second solenoid 115b is used to obtain a reverse movement or intermittent oscillation of the positioning shafts. A second set of contacts 122 (see Fig. 5) is utilized to provide an electrical connection to energize the second solenoid 115b to actuate the positioning shafts in the reverse direction at the completion of the rewind operation. The leading end of the film is provided with a cutaway or conductive portion (not shown) which is similar to the cutaway portion 81 at the trailing end of the film. When the film has been substantially rewound onto the supply reel at the rewind stage, the cutaway portion reaches the rewind contacts 122 closing the circuit to energize the solenoid 115b. The magazine is provided with a pair of contacts 123a which slidingly engage a pair of vertical strip contacts 124a mounted on the eyepiece standard 160a at the rewind stage. The length of the strip contacts 124a is slightly greater than the length of the slots 37 at the rewind stage so that sliding contact will be broken and deenergize the solenoid 115b when the detents 77 drop to a position where they are clear of the slots 37.

The strip contacts are electrically connected to their respective solenoid by conventional wiring (not shown). It will be apparent that a conventional relay switch may be connected to the solenoid means 115 as a substitute for the timing contacts 124, or in addition thereto in order to insure more positive action.

By the virtue of the present construction and method, a plurality of magazines may be superposed at the playing stage. When the film in the first magazine has completed playing, the positioning shafts 30 are rotated 22½° clockwise by actuation of the solenoid 115a upon closing of the contacts 120 through the cutaway portion 81 on the trailing end of the film. The slots 38 are thereby positioned directly under the detents 77 at the playing stage and the magazine drops. The length of the timing strip contacts 124b is such that the circuit is broken when the detents 77 emerge from the slots 38 thereby deenergizing the solenoid 115a which permits the springs 115c—115d to return the positioning shafts to the neutral position. By this arrangement, the second magazine will come to rest at the playing stage and the first magazine will stop at the rewind stage. As soon as the first magazine at the rewind stage is rewound, the solenoid 115b will be actuated and the positioning shafts 30 will be rotated 22½° in the counterclockwise direction so that the slots 37 are directly under the detents 77 and the first magazine will drop to the storage stage.

Meanwhile, the second magazine at the playing stage will be unwound and is dropped upon completion of the playing operation as heretofore described. The distance between the playing stage and the rewind stage, as shown, is sufficient to accommodate two magazines. Thus, the magazine at the playing stage may drop before the preceding magazine at the rewind stage has dropped to the storage stage. Also, both said magazines may drop simultaneously, in which event the positioning shafts will be rotated a full 45° in one direction. By this arrangement, varying lengths of film may be used.

Thus, referring particularly to Fig. 2, four magazines are shown in position, the top magazine being shown in the playing position, the preceding magazine being shown in the rewind position, and two preceding magazines being shown in the storage position. Each of the magazines is provided at its base with rubber snubbers 78 to break the dropping contact caused by one magazine dropping onto the succeeding magazine at the completion of the positioning operation. The storage portions of the positioning shafts 30a and 30b, as shown in Fig. 2, may be lengthened to accommodate any desired number of magazines.

Referring now to the magazine internal structure, particularly as shown in Fig. 5, a full reel of film 80 is shown wound on the playing reel 82, the reel 82 being mounted on a playing reel pin mounting 84 preferably, as shown, in the form of a one-way clutch. Similarly, a take-up reel 83 is mounted on the take-up reel pin mounting 85, which is also shown in the form of a one-way clutch. The magazine is laterally separated into two compartments by means of a partition 79 (see Figs. 3, 4, 6 and 8) which is spaced intermediate and parallel to the top and bottom walls of the magazine 70. The upper portion is adapted to contain the reel of film and the lower portion is adapted to contain the mechanism which drives the film by means of a sprocket arrangement through the projecting mechanism, indicated generally at A, mounted in the area adjacent and forward of the projection lens system.

Referring now to the drive shaft 40 (see Fig. 8), a driving sleeve 41 is mounted thereon, the sleeve being provided with a longitudinal slot 43b which is adapted to engage the pulley drive wheel 87b by means of a spring biased detent 48b. The magazine 70 is provided with a magazine sleeve 88b which is adapted to receive the drive sleeve or collar 41.

The pulley wheel 87b is connected to the playing reel 82 by means of a pulley drive arrangement 86b. A toothed wheel 91b is integrally attached to the pulley wheel 87b, the toothed wheel 91b being meshed with pin 92 by means of the toothed wheel 93 integrally mounted thereon (see Figs. 5 and 5a). The pin 92 carries a cam 94 which serves to actuate shutter arm 95, which has an end shutter portion 95a adapted to oscil- late in front of the aperture 152 in the guide members 151 in a conventional manner, as more particularly shown in Fig. 5.

The reduction gear wheel 93 on the pin 92 is geared to the gear wheel 91a which is integral with the pulley wheel 87a which, in turn, is connected to the rewind shaft 45 at the rewind stage, but which is not connected to the rewind shaft 45 at the playing stage. The pulley wheel 87a is connected by a pulley 86a to the rewind reel 83 mounted on the pin mounting 85.

The pin mountings 84—85 are in the form of a one-way clutch, as shown, to prevent unwinding of the reels during loading thereof and to maintain them in synchronization.

Referring to Fig. 5, it will be seen that the gear wheel 91b is rotated clockwise by the clockwise movement of the driving shaft 40, which is operatively connected through the drive sleeve 41 and spring biased detent 48b in the sleeve slot 47b mounted on the pulley wheel 87b which also rotates clockwise. The playing reel 82 is rotated clockwise through the pulley arrangement 86b connected to the pulley wheel 87b.

The reduction gear 93 meshed with the gear wheel 91b is rotated counterclockwise and causes pivotal movement of the shutter arm 95 carried on a pivot pin 96, the pivotal movement being caused by engagement of the shutter arm 95 with the surface of the cam 94.

Additionally, the reduction gear 93 is meshed with the gear wheel 91a causing clockwise rotation thereof. The construction of the rewind elements is similar to that of the opposing playing elements. Thus, the gear wheel 91a is integral with the rewind pulley wheel 87a which is rotated counterclockwise and likewise affects counterclockwise rotation of the rewind reel 83 through the rewind pulley connection 86a at the rewind stage.

Thus, at the playing stage, the strip film 80 is unwound from the playing reel and passes partially around a tension or guide roller 140b in a counterclockwise direction and engages a sprocketed wheel 141b mounted in alignment above the pulley wheel 87b, and integrally connected thereto by means of the magazine sleeve 88b (see Fig. 8).

In the embodiment shown, the film is provided with conventional mating perforations to engage the sprockets on the sprocket wheel 141b, as is well known in the art. The film is disengaged from the sprocket wheel 141b by means of a take-off roller 142b and is adjusted so as to provide an excess loop 89b. The film then passes along the arcuate film guide 150 and is held thereagainst by guide member 151. Film guide 150 is provided at its center with an aperture 152 in registry with the spring biased shutter 95a.

The film, shown emerging from the guide members 150—151, forms an excess loop 80a and is passed between a guide roller 142a and the rewind sprocket wheel 141a. As shown, passing about one-half the circumference of the sprocket wheel 141a, the film is fed against the guide wheel 140a and thence through two pairs of spaced opposing roller wheels 150. Between the roller wheels 150, and in opposed spaced relation, are mounted both the photocell element 151 and the sound projection lens 64. The photocell element 151 is mounted on the sound pickup standard 50 and the sound projection lens system 64 is mounted in the projection standard 60. At this stage, the sound is taken up from the sound track on the film by means of the conventional sound pickup device 51 including an electric eye 51a, through the photocell lens 151a (see Fig. 7).

As shown leaving the rollers 150, the film 80 is fed about a pair of rollers 154 toward and around a roller 155 and is thereafter wound on the takeup reel 83.

The foregoing operation takes place at the playing stage and it will be apparent from the foregoing description and from the drawings that the reverse operation takes place at the rewind stage. Thus, when the magazine 70 is positioned at the rewind stage, the rewind shaft 45 engages the spring biased detent plug 48a thereby causing movement of the rewind mechanism on the magazine in a reverse direction from that heretofore set forth at the playing stage. Thus, it will be seen that by this means the film will be transferred from the takeup reel 83 and will be rewound onto the playing reel 82.

Referring now to the projection system, particularly as shown in Fig. 5, it will be understood that the projection lamp 61 emits light rays which are transmitted through the lens system 62, through the film exposed in the projection opening 152, and thence through an eye piece lens system 160 of the type which will turn the image 90° in order to enable the use of conventional movie or sound movie films. In addition, a reflector 63, disposed behind the projection lamp 61, is preferably used to reflect light into the lens system 62.

Additionally, light from the projection lamp 61 is transmitted by the sound pickup lens system 64 through an opening 66 in the projection standard and thence through the sound track on the film 80 to sensitize the photocell through lens 151a, shown in Fig. 7, thereby energizing the electrical eye 51a and sound pickup device 51.

It will be apparent that the sound pickup track is positioned sufficiently ahead of the appropriate frame of the film (conventionally about 10 inches for 16 mm. sound film) so as to accommodate the film passage distance between the projection opening 152 and the opening 66 in the sound standard 60 so as to properly coordinate the projected frame and the sound.

It has been found advantageous to use resilient shock absorbing means 78, such as rubber bumpers, to eliminate noise and to break the drop of the magazines when they reach the storage stage. The magazines and projector are preferably provided with lateral positioning means, shown in the form of guide standards 20a and 20b having opposed keyway portions 21a and 21b slidably contacting the guide pins 71a and 71b of the magazines in order to balance the magazine.

As shown particularly in Figs. 3 and 6, the cooling system necessary to dissipate the heat created by the projection lamp 61 is provided by the motor fan 14a which draws air through the vents 170 on the adjacent side at the base of the cabinet and into the housing 14b which communicates with the conduit or air passage 65 provided by the projection standard 60.

The projector is provided with a conventional loud speaker 180 electrically connected to the sound takeoff unit 51, the speaker being conveniently maintained in the front panel at the base of the cabinet as shown particularly in Figs. 3 and 9. As shown in Fig. 3, the base of the cabinet is suitably apertured in front of the speaker 180, the aperture being conventionally covered with a suitable sound transmitter cloth 181.

The back panel of the projector base, as shown in Fig. 2, is conventionally fitted with projector controls and electric cord 186. The conventional controls generally comprise a motor switch 187, a projection lamp switch 188, D. C.-A. C. switch 189, a sound takeoff unit switch 190, and a pair of controls 191 and 192 for controlling sound volume and tone. The switch 190 is provided for controlling the number of frames per minute to be projected. In the present embodiment, when using standard sound films of the 16 mm. type, the shutter speed is set at 24 frames per minute for sound and 16 frames per minute for ordinary 16 mm. film without sound.

In the embodiment shown, the driving means for unwinding the film includes a pair of drive shafts, one of which is operatively connected to the magazine at the playing stage and the other of which is operatively connected to the magazine at a non-projecting stage, namely, the rewind stage. Also, in the embodiment shown, the drive shaft and the rewind shaft are shown as geared to a main drive shaft and it will be apparent that various mechanical drive arrangements may be utilized by those skilled in the art to accomplish the purposes and methods of the present invention.

Likewise, the positioning shafts in the preferred embodiment are operatively connected to common actuating means, namely, a solenoid operated drive, and it will be apparent to those skilled in the art that other mechanical driving arrangements may be utilized to accomplish the purposes and methods of the present invention.

In another aspect of the invention, provision is made for combining a motion picture projector, preferably of the type disclosed, in combination with a television receiver in a unitary cabinet construction. Thus, referring to Figs. 12 and 13, there is shown a cabinet construction in a preferred embodiment which comprises in combination, a television receiver, a motion picture projector and a translucent screen for receiving images projected from either the television receiver or from the motion picture projector.

In the form shown, the cabinet is provided internally at its corners with L-shaped vertical guides slideably positioning a movable platform carrying both the projector and the receiver, one above the other. The cabinet is provided with an aperture and the platform is adapted to be moved vertically so that either the projector or the receiver may be in registry with the aperture.

In the form shown, the translucent screen is made vertically and reversably movable in respect to the movable platform by a conventional rack and pinion connection so that the screen and the projector may be in registry with the aperture at the same time, if desired. In this embodiment, the screen will remain out of registry with the television receiver. The movable platform is connected to a conventional counterweight and pulley system to balance the vertical movement of the platform. It will be apparent that various conventional movable support arrangements may be utilized to move and position the platform. It will also be apparent that a single loud speaker and amplifier system may be used for both the projector and the television receiver. The present cabinet construction has the advantage that both the television receiver and the motion picture projector may be individually placed in registry with a single aperture in a cabinet utilizing a minimum amount of space.

In a modified form of cabinet construction, as shown in Figs. 14 and 15, there is provided a unitary cabinet having a conventional swivel type reflector mounted between the projector unit and the television receiver unit. The images from either unit may be reflected by the swivel type reflector onto a second fixed reflector and thence to a translucent screen in a conventional manner. By virtue of this arrangement, a single aperture and/or a single translucent screen may be utilized to view the images emitted by either the projector or the receiver without moving either unit.

In a further modification of the present cabinet structure, as shown in Fig. 16, there is provided a unitary cabinet containing both a fixed projector and a fixed receiver, and in this form, an individual aperture is provided in registry with each unit.

Thus, in one broad aspect, the present invention generally is directed to a cabinet construction involving the combination of a television receiver, apparatus for projecting strip film, and a screen for receiving images projected from said projection apparatus or from said receiver. In a preferred aspect, the present invention generally is directed to a cabinet construction involving the combination of a motion picture projector, a television picture projector, said cabinet having an aperture, a translucent screen adapted to be positioned in and out of registry with said aperture, and a common means for supporting said projector in superposed relation, said support being vertically movable for bringing either of said projectors into registry with said aperture.

Also, in a further broad aspect, the present invention is directed to apparatus for projecting strip film comprising a projector, a magazine adapted to contain a wound reel of said film, driving means for unwinding said film, said projector including a projection stage, a rewind stage and a storage stage, and positioning means for maintaining said magazine at the projecting stage during the unwinding operation, for transferring said magazine to the rewind stage, for maintaining said magazine at the rewind stage and for transferring said magazine to the storage stage, although it will be apparent to those skilled in the art that other embodiments of the present apparatus may be utilized to accomplish the present method of projecting strip film wound on a reel in a magazine carried in a projector having a projecting portion, a rewinding portion and a storage portion which comprises supporting said magazine in the projection portion, unwinding and simultaneously projecting said film while the magazine is maintained in the projecting portion, transferring said magazine to the rewinding portion, rewinding said unwound film while the magazine is maintained in the rewinding portion, and thereafter transferring said magazine to the storage portion.

Accordingly, while the apparatus and methods of the present invention have been disclosed in the form of a preferred embodiment, it will be apparent to those skilled in the art that various modifications and departures may be made therein and it is intended that all such modifications as come within the terms and scope of the appended claims be included.

I claim:

1. An apparatus for projecting strip film comprising a projector, a magazine adapted to contain said film, means for driving said film in said magazine, said projector including an upper projecting level, a lower non-projecting level, releasable positioning means including a vertical guide for maintaining said magazine at the projecting level during the film unwinding operation, and means cooperating with the vertical guide for releasing said magazine for gravitationally transferring said magazine to the non-projecting level, said driving means including a film unwinding means in the magazine and a driven vertical shaft, the vertical shaft being operatively connected with the said unwinding means at the upper projecting level only during the unwinding operation.

2. The apparatus as set forth in claim 1 wherein the projector includes in addition a first vertical support carrying a projection lamp and a second vertical support carrying a projection lens, positioned at the projecting level.

3. The apparatus as set forth in claim 1 wherein said projector includes in addition a vertical support carrying a projection lamp and said magazine is provided with an opening for receiving said projecting lamp.

4. An apparatus as set forth in claim 3 wherein said projector includes a vertical support carrying a sound pick up means and said magazine is provided with an opening for receiving said sound pick up means.

5. An apparatus as set forth in claim 4 wherein said projector includes a vertical support carrying part of a lens system, said lens system, said projector lamp and said sound pick up means being positioned at the projecting level and both the lens system and the sound pick up means being in operative relation with the single projecting lamp.

6. An apparatus as set forth in claim 1 wherein said means for releasing said magazine includes one rotatable vertical guide shaft at each side of said film magazine and means responsive to the rotation of said guides for transferring the magazine from one level to another.

7. An apparatus as set forth in claim 6 wherein said vertical guide shafts are operatively connected and are rotated in response to solenoids activated by a predetermined portion of the film during said unwinding.

8. An apparatus for projecting strip film comprising a projector, a magazine adapted to contain film, means for driving said film in said magazine, said projector including an upper projecting and unwinding level, a lower rewinding level and a storage level beneath the rewinding level, releasable positioning means including a vertical guide for maintaining said magazine at the projecting level during the film unwinding operation and at the rewinding level during the rewinding operation, and means cooperating with the vertical guide for releasing said magazine for gravitationally transferring said magazine from the unwinding level to the rewinding level, and from the rewinding level to the storage level, said driving means including a film unwinding means and a film rewinding means in the magazine, and a first and second driven vertical shaft, said first vertical shaft being operatively connected with said unwinding means in the magazine only at the projecting level, and said second vertical shaft being operatively connected with said rewinding means in the magazine at the rewinding level.

9. An apparatus as set forth in claim 8 wherein said driven vertical shafts are interconnected at a point below the storage level and each is provided with means for connecting with the film operating means in said magazine at their respective operative levels.

LEONARD OESTREICHER.

REFERENCES CITED

The following references are of record in the file of this patent:

UNITED STATES PATENTS

| Number | Name | Date |
|---|---|---|
| 1,245,755 | Mehlfelder | Nov. 6, 1917 |
| 2,206,134 | Streyckmans | July 2, 1940 |
| 2,227,259 | Hokanson | Dec. 31, 1940 |
| 2,322,489 | Meadler | June 22, 1943 |
| 2,434,200 | Engelken | Jan. 6, 1948 |
| 2,485,709 | Davock | Oct. 25, 1949 |
| 2,497,931 | Daly | Feb. 21, 1950 |
| 2,505,505 | Sachtleben | Apr. 25, 1950 |
| 2,509,508 | Kalff et al. | May 30, 1950 |

FOREIGN PATENTS

| Number | Country | Date |
|---|---|---|
| 201,202 | Great Britain | July 30, 1923 |